United States Patent
Sidler et al.

(10) Patent No.: US 12,293,377 B2
(45) Date of Patent: May 6, 2025

(54) RISK CLUSTERING AND SEGMENTATION

(71) Applicant: International Business Machines Corporation, Armonk, NY (US)

(72) Inventors: Christopher Sidler, Bethesda, MD (US); Raymond Strecker, Jersey City, NJ (US); Michael A Dawson, Washington, DC (US); Sankar Virdhagriswaran, Boxborough, MA (US); Jon E Elvin, Gibsonia, PA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 17/218,467

(22) Filed: Mar. 31, 2021

(65) Prior Publication Data

US 2022/0318819 A1     Oct. 6, 2022

(51) Int. Cl.
  *G06Q 30/018*     (2023.01)
  *G06F 16/28*     (2019.01)
  *G06N 20/00*     (2019.01)

(52) U.S. Cl.
  CPC ....... *G06Q 30/0185* (2013.01); *G06F 16/285* (2019.01); *G06N 20/00* (2019.01)

(58) Field of Classification Search
  CPC ... G06Q 30/0185; G06F 16/285; G06N 20/00
  USPC .......................................................... 705/318
  See application file for complete search history.

(56) References Cited

U.S. PATENT DOCUMENTS

| | | | |
|---|---|---|---|
| 7,805,362 B1 | 9/2010 | Merrell | |
| 10,565,592 B2 | 2/2020 | Enzaldo | |
| 2010/0228580 A1* | 9/2010 | Zoldi | G06Q 40/12 707/E17.014 |
| 2016/0253672 A1* | 9/2016 | Hunter | G06Q 40/06 705/39 |
| 2017/0206272 A1* | 7/2017 | Neela | G06F 16/3343 |

(Continued)

FOREIGN PATENT DOCUMENTS

| CN | 107169857 A | 9/2017 |
|---|---|---|
| WO | 2020102395 A1 | 5/2020 |

OTHER PUBLICATIONS

Andrew Tausz, "Similarity clustering to catch fraud rings", Feb. 20, 2020, retrieved from https://stripe.com/blog/similarity-clustering (Year: 2020).*

(Continued)

*Primary Examiner* — Jessica Lemieux
*Assistant Examiner* — Joshua D Schneider
(74) *Attorney, Agent, or Firm* — Zilka-Kotab, P.C.

(57) ABSTRACT

Monitoring transaction activity for system requests for a set of entities authorized to request services of a system is described. Entities with high feature values for respective features of the set of activity based features are identified to produce a set of outlier entities. The outlier entities are filtered from the set of entities. A set of clusters are created from the filtered set of entities based on the set of activity based features so that each entity in the filtered set of entities is assigned to a cluster. Values for the set of activity based features are established for each cluster. A risk is assigned for each cluster based on the values of one or more of the set of activity based features. Each of the filtered set of entities are monitored based on the risk assigned to the respective clusters to which the respective entities belong.

20 Claims, 7 Drawing Sheets

(56) References Cited

U.S. PATENT DOCUMENTS

| | | | |
|---|---|---|---|
| 2017/0270428 A1* | 9/2017 | Zoldi | G06N 20/00 |
| 2017/0270534 A1 | 9/2017 | Zoldi | |
| 2018/0316707 A1* | 11/2018 | Dodson | H04L 43/16 |
| 2019/0325528 A1 | 10/2019 | Adijaoute | |
| 2020/0250743 A1* | 8/2020 | Hanis | G06F 16/285 |
| 2020/0293970 A1* | 9/2020 | Hwang | G06Q 10/0635 |

OTHER PUBLICATIONS

Sutapat Thiprungsri et al., "Cluster Analysis for Anomaly Detection in Accounting Data: An Audit Approach", 2011, The International Journal of Digital Accounting Research vol. 11, pp. 69-84 ISSN: 1577-8517 (Year: 2011).*

S. Kannan and K. Somasundaram, "Autoregressive-based Outlier Algorithm to Detect Money Laundering Activities", 2017, Journal of Money Laundering Control; London vol. 20, Iss. 2, (2017): 190-202. DOI:10.1108/JMLC-07-2016-0031 (Year: 2017).*

"Financial Fraud Detection With Anomaly Feature Detection",Huang D et al., IEEE Access, vol. 06, pp. 19161-19174, 2018.

* cited by examiner

| SEGMENT | INACTIVE | A | B | C | D | OUTLIER |
|---|---|---|---|---|---|---|
| CLUSTERS | INACTIVE | 1, 2, 3, 4, 13 | 5, 7, 11, 12, 14 | 6, 8, 9 | 10 | OUTLIER |
| COMMON CHARACT-ERISTICS | NO ACTIVITY IN PERIOD | LOW TRANSACTION VOLUMES AND VALUES | MODERATE TRANSACTION VOLUMES AND VALUES. CASH OR WIRES HIGHER THAN CLUSTERS IN SEGMENT A | HIGHER TRANSACTION VALUES OR TRANSACTION VOLUME | HIGHEST OVERALL TRANSACTION VALUES AND HIGH WIRE VALUES | EXCEEDED OUTLIER THRESHOLDS FOR ONE OR MORE RELEVANT FEATURE |

FIG. 4

| USER INFORMATION | DESCRIPTION |
|---|---|
| USER INFORMATION 701 | USER ID, USER ACCOUNT NUMBERS, USER DEMOGRAPHIC, USER PERMANENT RESIDENCE, BIRTH DATE, OCCUPATION CODE |
| USER TRANSACTIONS 703 | USER ACCOUNT NUMBERS AND AMOUNTS FOR TRANSACTIONS, ACCOUNT TYPES, COUNTRY OF PERMANENT RESIDENCE, BIRTH DATE, OCCUPATION CODE |
| USER TRANSACTION WIRE TRANSACTIONS 705 | USER ACCOUNT NUMBERS AND AMOUNTS FOR WIRE TRANSACTIONS, ENTITY- AND ACTIVITY-RISK INDICATORS |
| USER TRANSACTION CASH TRANSACTIONS 707 | USER ACCOUNT NUMBERS AND AMOUNTS FOR CASH TRANSACTIONS, ENTITY- AND ACTIVITY-RISK INDICATORS |

FIG. 7

RISK CLUSTERING AND SEGMENTATION

BACKGROUND OF THE INVENTION

This disclosure relates generally to estimating risks with user transactions. More particularly, it relates to selectively monitoring individual users of system services according to a clustering and segmentation process.

Many organization are expected to understand the riskiness posed by their respective customers to their services. Many regulations and laws exist and which vary from jurisdiction detailing these obligations. Financial organizations tend to be subject to many of these laws and regulations. For example, these organizations are expected to assess their customer users based on their risk from an anti-money laundering (AML) perspective. Because of the cost associated with monitoring their customers, these organizations want to install controls commensurate with the risk posed by the respective customer. Such controls may include, among others, subjecting a "high risk" customer to enhanced due diligence or higher levels of monitoring of their ongoing activities.

Traditional methods of determining customer risk from an AML perspective typically use biographical indicators to quantify the risk posed by a particular customer. It is also common that questionnaires are used to assess risk. However, these biographical indicators often do not correlate strongly with actual risk, and so, many organizations waste time and resources installing controls on legitimate, well-behaved customers. Further, the user answers to questionnaires may be suspect, particularly for those users which turn out to be AML risks for the organization. Even well intentioned user may give inaccurate information due to language limitations, lack of understanding of transaction types, patience with the questionnaire process and the ability of staff to explain the questions being asked.

User risk is often determined through estimation of the user's expected transaction activity on the account(s) the customer holds with the financial organization. When the estimation is determined through a questionnaire process with the customer, the quantified expected activity is often a poor predictor of actual activity. Deviations from an expected activity as compared to the customer's actual activity are used to indicate heightened AML, risk. However, when the prediction is inaccurate, the deviations may be misleading and lead to unneeded actions. Therefore, the financial organizations waste time and resource.

Thus, because static indicators and traditional means of predicting expected user activity, as described above, result in a poor estimation of the user risk posed to the organization, further improvements in assessing user risk are needed.

BRIEF SUMMARY

According to this disclosure, a method, apparatus and computer program product for monitoring user transaction activity for system requests. The system receives information about a set of activity based features from a set of monitoring processes for a set of entities of a system. The entities are outside the control of and authorized to request services of a system. Respective entities with high feature values for respective features of the set of activity based features are identified to produce a set of outlier entities. The outlier entities are filtered from the set of entities to produce a filtered set of entities. A set of clusters are created from the filtered set of entities based on the set of activity based features so that each entity in the filtered set of entities is assigned to a cluster. Values for each of the set of activity based features are established for each cluster. A risk is assigned for each cluster based on the values of one or more of the set of activity based features. Each of the filtered set of entities are monitored based on the risk assigned to the respective clusters to which the respective entities belong.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 depicts a set of clusters and segments produced by an embodiment of the invention;

FIG. 7 shows a set of user information for an embodiment of the invention.

DETAILED DESCRIPTION OF AN ILLUSTRATIVE EMBODIMENT

At a high level, the invention provides a method, system and computer program product for assessing user risk and monitoring users based on the assessed risk. Embodiments use a machine-learning based technique that includes identifying user activity-related parameters associated with heightened user risk and uses these features in a clustering algorithm to group users into clusters based on similarity of observed (i.e., past actual) user activity. A bisecting k-means clustering method is used in embodiments of the invention to create the clusters. The clusters are then evaluated based on the relative riskiness of the resultant user feature averages and other factors. In some embodiments of the invention, the clusters are segmented into categories, e.g., those segments that pose low, moderate, and high risk. Once the clusters are established, the process is repeated to determine how user features within the clusters change and which common user features change together in time. For example, a customer belonging to a first cluster in an initial clustering may exhibit user activity or other characteristics which diverge from the changes to the changes in user features of other customers belonging to the cluster. This user divergence is regarded as an indicia of risk in some embodiments. In embodiments of the invention, a "time-series" is used to cluster and measure changes in baseline user risk profiles for each of the clusters.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
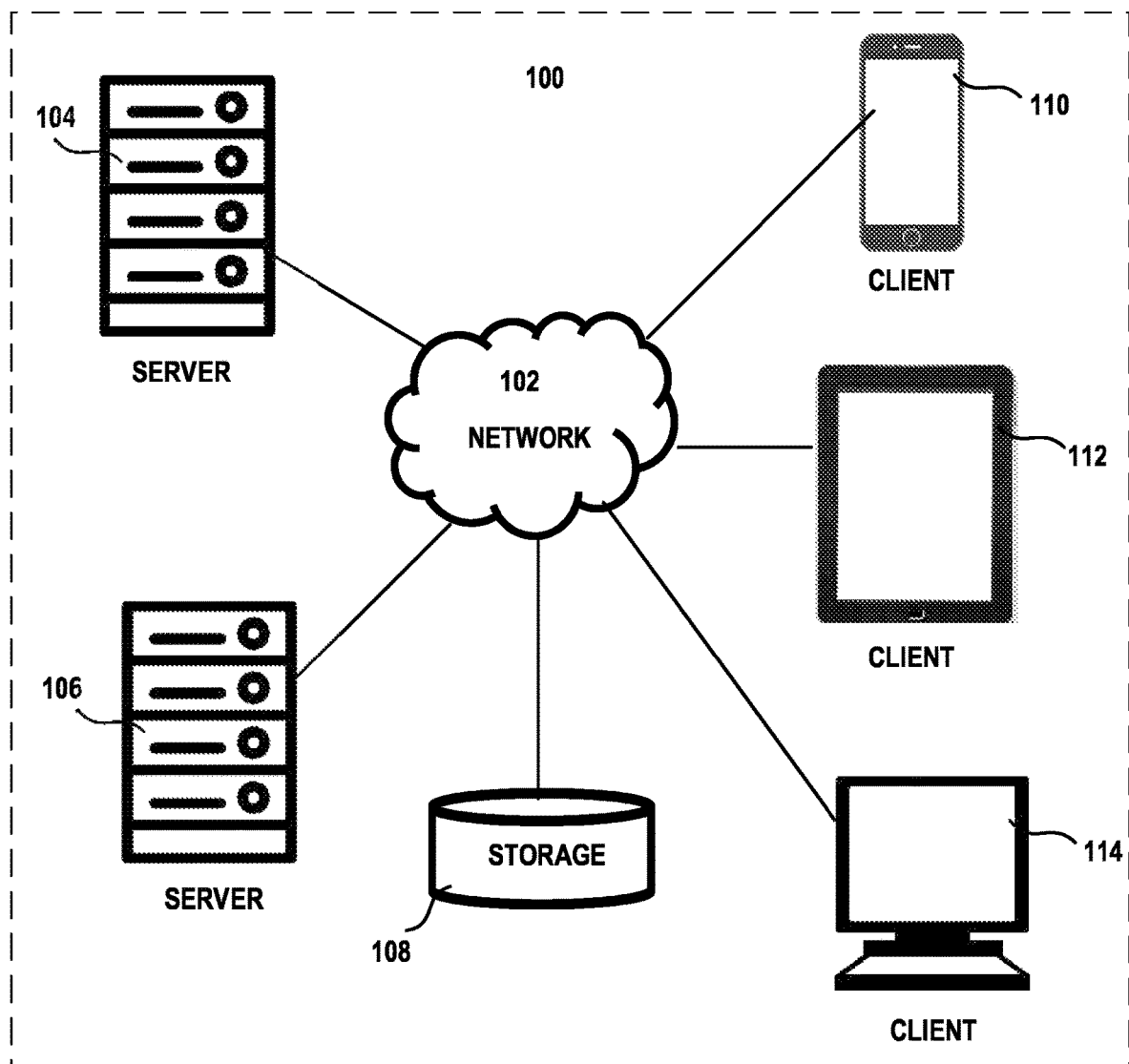
FIG. 1 depicts an exemplary block diagram of a distributed data processing environment in which exemplary aspects of the illustrative embodiments may be implemented.
Figure 2:
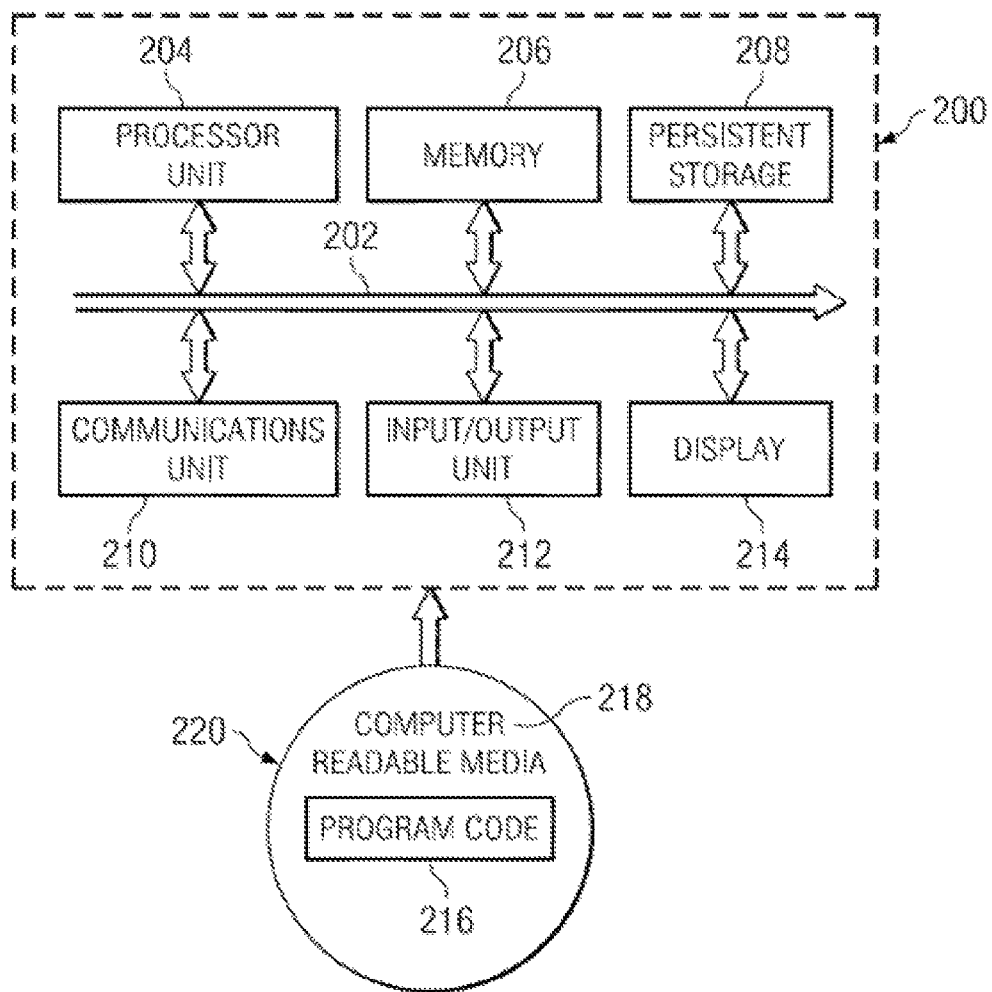
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The embodiments which will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 3:
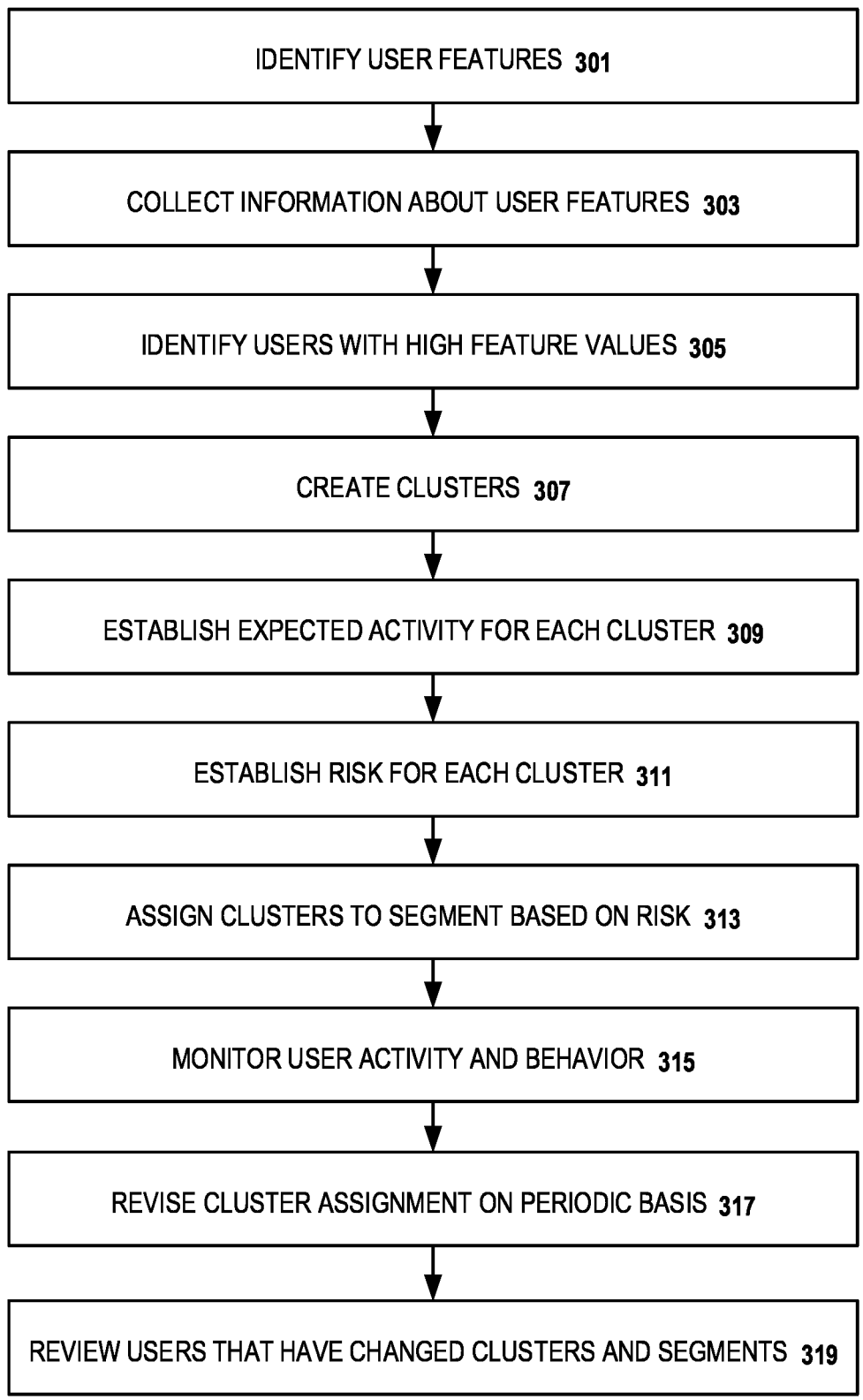
FIG. 3 depicts a high level flow diagram of an embodiment of the invention.

FIG. 3 depicts a high level flow diagram of an embodiment of the invention. In step 301, the system identifies the user features which will be used to predict user activity, i.e., whether the user will entail risk to the organization. In preferred embodiments, the user features will be activity based user features, rather than biographical type user features. Exemplary activity based features for a financial organization include an average monthly transaction volume of the user and a value of each of the transactions. The transaction volume can be categorized according to an aggregate volume and also by incoming and outgoing aggregate volumes. These features can be quantified by number of transactions and/or total value amount of the transactions. Other useful activity based user features are the average monthly transaction volume and the volume and value of specific transaction types (cash, wires, and so forth). Again, the average month volumes and values for specific types of transactions can be categorized both in aggregate and by separate incoming and outgoing features (both number and total value). When identifying user risk for other types of organizations, other user activity based features would be used which summarized the types of user activity in other embodiments of the invention.

In preferred embodiments, identifying user features which should be used in the clustering process is a machine learning step which uses a set of known users, the users' activities and the risks encountered by the organization from these users. The risks can be measured reports of incidents, alerts and notifications generated by the user activity. In some embodiments, unsupervised machine learning techniques such as clustering techniques or statistical methods such as logistic regression and random forest are used to determine whether a candidate user feature is indicative of risk for the system. For example, user feature may indicate (be correlated to) the existence of an AML case investigation. The identified user features, i.e., those identified by the machine learning, are derived from the entire set of available user features which are related to the types of the user's activities related to the services offered by the system to the users (e.g., use of various types of banking products).

As will be described below, once known, the user activity based features are used in the formation of user clusters which are expected to include users with comparable risk. In addition to their use in clustering, the identified user features indicative of customer activity are used in the segmentation of the clusters into segments which is described below.

In alternative embodiments, the activity based user features will be supplemented with non-activity based user features.

In step 303, the system collects information about the user features. In the preferred embodiments, the user features are activity based features, but in alternative embodiments additional, non-activity based user features may be also included in the data collection step. The additional non-activity based user feature information collected about respective users can include, for example, user biographical attributes such as politically exposed persons (PEP) status—both of the user and by association with the user, the country associated with the user (including the riskiness of country), the occupation of the user and the transaction experience of the organization and/or of other organizations that exchange data on respective users. While this historical transaction experience can include the actual user transaction information collected by the organization, it can also include summarized activity information such as incident reports, alerts, cases and suspicious activity reports associated with the user and/or their associates which are not necessarily associated with specific transactions. The "non-activity" based user feature information is used in some embodiments of the invention to supplement the activity-based analysis to arrive at the overall and specific risks posed by the user. The "non-activity" based user feature information is also used by the machine learning process to correlate which values of non-activity based user features are related to which values of activity based user features so that new users can be assigned to clusters. In these embodiments, the non-activity based user features are used in the either or both of the clustering and segmentation processes described below.

In step 305, the system identifies the users with high feature values. In preferred embodiments, the users with high feature values for respective user features, i.e., high outlier values with one or more user features, are evaluated separately. These users are separated from the following clustering and segmentation processes. In these embodiments, these users are designated for enhanced due diligence or higher levels of monitoring and scrutiny of their ongoing activities. They are not assigned to a cluster or a segment in the process described in the following embodiment (though in some ways they can be considered their own segment). In some embodiments, thresholds are used for respective user features to establish which users are considered outlier users. In the alternative, statistical methods such normal distributions or other distributions of user feature values are used to establish which values indicate which users are outlier users. That is, user values which are one or more standard deviations (or the established threshold) from the user average are considered outliers. In preferred embodiments, the same user features which are used for the clustering process are used for establishing the outlier users. In practice, the outlier users comprise a small percentage, e.g., less than 10 percent, preferably less than 5 percent, of the total user population.

In step 307, the system creates user clusters based on the selected user features. In preferred embodiments, the clusters are created after the "outlier" users are separated or filtered from the overall user pool. As will explained below, the outlier users can include both the users with high, extreme user features as well as those users with no or extremely little activity. Like the high outliers, the low outliers can be based on thresholds or statistical distributions. In embodiments of the invention, the user cluster is the basis for the expected activity and risk for the users assigned to the cluster used for additional operations such as the type and number of enhanced scrutiny and monitoring operations performed on a user account.

In embodiments, the organization can set a predetermined optimal number of clusters, e.g., 13 to 20 user clusters. While more clusters allow for finer assignment of users to each segment, in practice adding additional clusters provides diminishing returns. In the inventors' experience, a range of 13 to 20 user clusters is optimal from a cost-benefit standpoint (cost of computation, benefit of discrimination between respective users). In embodiments, the clusters are used in a subsequent step for the segmentation process. The results of the clustering step include user membership of the clusters and the average, median or centroid of user features for each of the respective clusters. These results are used to assign clusters to segments.

In step 309, the system establishes a value, e.g., a median or average value, for one or more expected user features, e.g., transaction activity, for each cluster. In some embodiments, while a plurality of user features is used for the clustering process, only a subset of the plurality of user features is used for the segmentation step. So, for example, a respective user feature, e.g., expected user activity, is used for the segmentation step. The user feature value can be expressed as a range, average, median, e.g., as a range of overall transaction activity and/or an average transaction activity of a specific type for a time period, e.g., a month. The subset of user features, e.g., transaction activity, for each of the clusters is reviewed and is used for segmentation of the clusters into segments. Once the system has evaluated the distinctions between the clusters established by the clustering algorithm(s), in preferred embodiments, the users assigned to a particular cluster are fixed for at least an initial period, as will be described below.

In step 311, the system establishes a risk for each user cluster. Through the preceding analysis, some clusters will emerge as more or less risky than other clusters. The risk assigned to each cluster may be based on a subset of the user features used for clustering, e.g., specific types of transaction activities and volumes of specific types of transaction activities. In the following steps, in some embodiments, those clusters with a similar transaction activity, and user risk are assigned to a "segment". Each segment contains a set of user clusters; the set can contain one or more user clusters.

Step 313 assigns user clusters to a particular segment based on risk and/or specific user features (e.g., transaction activity, overall or specific type) associated with the cluster. The user activity for a cluster can be assigned to the cluster based on a median or average value for the cluster or for the range of values established for one or more user features of the cluster as determined by the system. The risk is assigned to a cluster based on the average or median user feature(s) in embodiments. When the system assigns the clusters into segments, the inventors have found that segment membership (based on risk) is useful for the purposes of providing monitoring to the respective users. Based on user risk, the system expends the appropriate resources to monitor user features. When changes in individual user activity over time, users will change clusters and even segments.

Changes in user activity are important in establishing which users need additional monitoring. Users which change clusters over time within the same segment may be worthy of increased scrutiny, those users which change segments (with different risk) are much more likely to be worthy of increased scrutiny and monitoring, possibly to the extent of being treated as outlier users and worthy of individual attention.

In step 315, the user activities and activities are monitored by the system. Depending on the embodiment and the services that the organization is performing for the user as well as the user features selected for the clustering and/or segmentation, different user activities are monitored. For example, for a financial organization, transaction information such as number of transactions in a time period, the value of each transaction and the type of the transactions would be typical activity-based user features to monitor. This step produces a set of recent user feature values for each of the monitored user feature values.

Step 317 depicts the system revising the cluster assignment of users on a periodic basis based on the set of recent user feature values. In embodiments of the invention, revisions of cluster assignment occur at least on a first reoccurring interval and a second reoccurring interval. In a first, shorter interval, changes to individual user activity are evaluated but the clusters (i.e., their number and general characteristics) themselves do not change and the segments (i.e., which clusters belong to which segments) do not change. Note that there may be some small change in the average values of user features which define the cluster because of user activity during the first interval. The user activity changes are established by monitoring and/or logging user activities during the first interval by the systems which provide services to the users. User activity changes which cause specific users to change assignments from cluster to cluster or segment to segment over the interval period are evaluated with greater scrutiny. The first interval is selected to be short enough to detect user changes so that the system can react to impose additional monitoring but long enough so that the system can establish that the change in user activity is real and meaningful. In some embodiments, the first interval is a quarter of a year; in other embodiments the first interval is a month. Quarterly movements of users between segments are likely indicate meaningful changes in user activity, e.g., deviations from past activity of existing users or expected activity of new users based on their initial cluster assignment. Quarterly movements of users between clusters with similar risk are less likely indicate meaningful changes in activity.

The second interval is used to determine whether the current division of users to clusters, and therefore, clusters to segments is appropriate. In embodiments of the invention, since reclustering/resegmenting occurs at the second interval, it is a more major revision of the model than revisions taken at the first interval, since the number of clusters, cluster membership of all the users, cluster characteristics and cluster membership in the segments can change. In some embodiments, the second interval is a year. As the new users become existing users, actual user activity data has been acquired by the system. By the occurrence of the second interval, the actual user activity is used to assign users to a respective cluster since this step uses the current set of existing users. That is, all the "new" users have become existing users.

While not depicted in the drawing, new users are assigned to the existing clusters. In embodiments of the invention, initial user cluster assignment is performed based on how the new user appears to best fit a selected cluster within the set of existing clusters. In some embodiments, the average user features for respective clusters are compared to the user features of the new users. The user features for a new user can be derived from the basis of questionnaires, biographical information, or user account characteristics, e.g., account capabilities requested by the user. These types of non-activity based information are correlated to the user activity features used by the clustering step to create the clusters by the machine learning in some embodiments of the invention. Because questionnaire, biographical and capability information are frequently unreliable information to predict user activity, it is expected that a greater proportion of new users will exhibit meaningful changes in activity as compared to existing users. However, the non-activity information provides a starting cluster, and with the correlations provided by the machine learning, it is frequently better than assignment to a default cluster. Nonetheless, in other embodiments, the new users can be assigned to a default cluster, e.g., one with moderate or high levels of monitoring and analysis of their activities.

In embodiments of the invention, new users can be assigned to clusters based on rules established for risk. For example, the system can be provided with a rule based on non-activity based user features that all users with this set of user features present certain known higher risk characteristics and should be assigned to higher risk clusters. The rules can be determined categorically by an administrative user. For example, the rule may indicate all customers that operate in certain industries will be assigned to a higher risk cluster. Alternatively, either the machine learning or a technique such as logistic regression can be used to determine that certain non-activity based user features, e.g., the user business being in certain industries, are more closely correlated to certain clusters which are higher or lower risk in the segmentation.

In preferred embodiments, after a predetermined period(s) of time, i.e., after a given number of first intervals, the non-activity user features (e.g., the user features from the user questionnaire, biographical and/or account characteristic inputs) as compared to the actual user activity will be weighted so that the non-activity user features have progressively less importance to cluster membership. For example, it is expected that during an initial first interval, the questionnaire answers will be weighted more heavily because there is little to no actual user activity; after one or more first intervals of time, the questionnaire answers will be weighted less and less, until the actual user activity is the primary or sole criterion by which the user assignment to a cluster is determined. In embodiments of the invention, after the first interval, the actual user activity is the only criterion for cluster membership.

Further, in embodiments of the invention, the average or median values for the user activity based features for cluster members will change over time. As long as the user feature values for respective users in the cluster change with the user cluster, they will remain in the same cluster. Individual user activity changes can be large enough that they result in the user changing membership from cluster to cluster. As is mentioned elsewhere, changing cluster membership is an indicia for increased scrutiny.

In embodiments of the invention, in step 317, when the system reviews user activity data to reassign users to clusters based on risk, activity based user features and/or other user characteristics, new users are evaluated according to different criteria. That is, actual user activity from existing customers compared to actual user activity for new users may have a greater effect in terms of assigning the users the clusters. In these embodiments, existing users have a "stickier" assignment to a cluster than a new user, and so based on similar activity in the first interval, a "new" user is more likely to switch clusters than an existing user. In embodiments of the invention, thresholds between "new" and "existing" users can be established. For example, a new user may be defined as a user whose account is less than six months old, while an existing user may be defined as a user whose account is more than six months old. Additional graduations of the existing users and their assigned stickiness to particular clusters are used in embodiments of the invention. For example, new users can be defined as users with an account less than six months old, an existing user may be defined as a user whose account is more than six months old and less than two years old and a "heritage" user may be defined as a user whose account is more than two years old.

In embodiments, cluster and segment creation is performed on a periodic basis on the second interval. During the course of each second interval, e.g., during each year, the number of clusters will remain the same. At the time of cluster and segment creation, e.g., at the start of a next second interval (e.g., a second year), the number of clusters can change and with respect to the assignment of respective users the user may have different weightings of questionnaire based on non-activity and activity based user features depending on their "new" or "existing" state. In some embodiments of the invention, at the second interval, the weight assigned to the questionnaire based user features (or other non-activity based user features) is small or nil.

In embodiments of the invention, the correlations between the non-activity based user features and the activity based user features (established by the machine learning) will change with time so that during the year, new users with similar non-activity based user features will be assigned to different clusters.

In embodiments, the system also identifies "inactive users" who have not had a predetermined number (or volume) of transactions with a first or second interval in the 317 step. These users can be treated as "low outliers", so that the organization, e.g., a bank can work with these users individually, or in a different process than those users that can be clustered. Note that in preferred embodiments these "low outliers" will be handled in a separate process from the processes used for the "high outliers" who have very high relative user features in one or more user feature categories. As would be understood by those skilled in the art, the assessment of which users are "inactive" users are occur in other steps or in a separate step.

In step 319, the system reviews the users that have changed clusters and/or segments. In one embodiment, a list of users that have changed clusters and/or segments is forwarded to an administrative user for handling. The administrative user may use different processes for handling users which have changed clusters assigned to an identical risk as compared to users which have changed segments since segments are defined to have different risks by the system. For example, those users which change segment membership may have automatic enhanced (and perhaps expedited) monitoring; users changing between clusters of comparative risk and/or activity may only be surfaced to the administrative user for possible action. For the users who change between clusters of comparative risk, only if enhanced monitoring is confirmed by the administrative user (e.g., by means of a user prompt and response) is such an action performed. In another embodiment, users which change segments have automatic increased scrutiny while those users which change clusters are forwarded to the administrative user. The administrative user can receive a list of users which have received automatic increased scrutiny.

In embodiments, the initial clusters are established on an annual frequency based on the transaction activity of the user population during the prior 12-month period. The number of clusters created is based on a subjective cost-benefit analysis. The system calculates the overall clustering error for the model using different numbers of clusters. Thus, the system identifies the number of clusters to use as the number of clusters at which the marginal rate of decline in the clustering error reaches a local minimum.

A k-means or a bisecting k-means clustering method is used in embodiments of the invention for the clustering steps. K-means clustering is one of the most commonly used clustering algorithms that clusters the data points into a predefined number of clusters. Bisecting k-means is a kind of hierarchical clustering using a divisive (or "top-down") approach: all users start in one cluster, the first cluster is split into two clusters and users divided between the two new clusters by "Euclidean distance", reassigns users between the two sub-clusters until a centroid calculated for the sub-cluster is stable. Then, the process is repeated for each new cluster and splits are performed on the clusters until the desired number of clusters is attained. Bisecting k-means can often be much faster than regular k-means; the two clustering methods will generally produce a different set of clusters. Other clustering algorithms such as Gaussian Mixture Model (GMM), Principal Component Analysis (PCA) and Power Iteration Clustering (PIC) can be used in alternative embodiments.

In preferred embodiments, the system uses machine learning to identify user features associated with heightened anti-money laundering (AML) risk. The clusters are then evaluated by the machine learning based on the relative riskiness of the resultant user feature averages, ranges, and other factors. In some embodiments of the invention, the user clusters are segmented into categories, e.g., those that pose low, moderate, and high risk. Through the logistic regression and other analysis performed by the machine learning, the system evaluates the extent to which the user features themselves were correlated to a risk, e.g., a heightened money laundering risk. This, in turn, strengthens the confidence in the model itself.

During segmentation, in some embodiments, where a plurality of user features is used to establish the clusters, a single one of the user features can be used to assign clusters to a respective segment. For example, when clustering a plurality of activity based user features and a non-activity based user feature are used. When segmenting, in some embodiments, a single activity based user feature, e.g., total expected transaction activity, is used for assigning the clusters to segments.

In preferred embodiments of the invention, the user's current cluster is the primary criterion for determining the amount of scrutiny (i.e., enhanced due diligence) that the customer receives. Users that are defined as "outliers" from the clustering operation as well as those that belong to higher risk clusters are selected to receive additional scrutiny as compared to users assigned to lower risk clusters. In some embodiments, a user transition between clusters is an additional reason for higher scrutiny of the user who switches clusters. When a user transitions between clusters of similar expected risk, that is, in the same segment, there is less of a reason to change the system actions which review the user and user transactions. That is, in some embodiments, user who switch clusters in the same segment receive the same amount scrutiny; there is no change in the monitoring action placed on the user account. When the user transitions between clusters which belong to different segments, since each of the segments are assigned to different risk, the monitoring actions imposed on the user action will change. That is, where the user transitions between a low risk segment to a medium risk segment, the number and nature of the system monitoring actions will increase. When the user transitions between a high risk segment to a medium risk segment, the number and nature of the system monitoring actions will decrease.

The embodiments described above assigns existing users to a set of clusters. The invention that new users are added to the system; when new user credentials are added after the initial clusters are created and segmented into the low, medium, and high risk segments, the new user is assigned to one of the existing clusters in one of the existing segments. As is described above, the clusters are created on a predetermined frequency and users are reassigned to clusters based on their user features. Thus, once the clusters are established based on the user features for the existing user population (e.g., based on the monitored features for a prior 12-month period), the new users are placed as their user features can be matched to the cluster features. The initial assignment may be based on non-activity based features such as questionnaire answers or biographical user features. As new user activity is accumulated, the new users may be expected to have more movement between clusters than well-known, existing users as questionnaire answers or biographical user features tend to be less reliable criteria to cluster users and preferred embodiments primarily use activity based user features. As described above, new users whose initial user features suggest that they belong within the higher risk clusters are selected for additional scrutiny. In time, where actual monitored user features indicate that the new user should be reassigned to lower risk clusters/segments, they will gradually have less monitoring by the system.

As new users are added, not only will the user membership of particular clusters change, but also particular clusters may have somewhat different average or range of user features. Another effect on cluster membership is the effect of adding a new service. The new service may be a substitute for an existing service. The new service may affect the total number of transactions for existing service as well as providing a new user feature for clustering. As adding new services and the clustering and segmenting processes are likely to be asynchronous, embodiments of the invention add new user features to the next clustering (first interval) or next clustering/segmenting (second interval) as appropriate. That is, as time progresses as new services are added or old services are deleted, user membership in clusters and segments will change accordingly.

In embodiments of the invention, the alerts used in step 303 include a SAR. A SAR is a "Suspicious Activity Report" which is a report that a regulated financial organization must provide to law enforcement when the financial organization has a suspicion that money laundering may have taken or may be taking place. A SAR indicator variable refers to a binary indicator of whether the user has been associated with a Suspicious Activity Report. A SAR or SAR indicator variable as that would be indicative of the user being of higher risk of money laundering.

FIG. 4 depicts a set of clusters and segments produced by an embodiment of the invention. Row 401 lists the segments formed by the system. Row 403 shows how the clusters formed by the system are categorized into segments. Row 405 lists some of the common characteristics of the clusters placed in a specific segment.

In this embodiment, six segments are used and the users assigned to each segment receive different treatment by the system. The first segment 407 contains the inactive users, i.e., the users with activity below a threshold or no activity during a monitoring period. Only the single cluster of inactive users are in this segment. The inactive cluster will have different processing applied to users in this cluster than to other segments which require more monitoring. Depending on the nature of the services provided by the system, the system may determine whether the users still need their account or send messages to the users to use system services. The second segment 409, "segment A" contains five clusters, clusters 1, 2, 3, 4 and 13. Each of these clusters are characterized by relatively low transaction volumes and low transaction values as compared to many of the other clusters. This segment is viewed as posing the lowest risk to the system. Users in this segment would be assigned a low level of the system monitoring resources. The third segment 411, "segment B", also contains five clusters, clusters 5, 7, 11, 12 and 14. The clusters in segment B are characterized by moderate transaction volumes and transaction values as compared to other clusters. This segment is viewed as having a low risk to the system; users in this segment would be assigned a relatively low level of the monitoring system resources, but perhaps higher than those in segment A. The types of monitoring performed for the users in segments A and B are the same in some embodiments of the invention.

The fourth segment 413, "Segment C" contains three clusters, clusters 6, 8 and 9. The users in this segment have higher transaction values or transaction volumes. These users are viewed having higher risk to the system or organization than the segments discussed above. Consequently, more system monitoring resources are devoted to the users in this segment. The types of monitoring actions applied to users in this segment may be different or augmented as compared to those used for those in segments A and B.

The fifth and sixth segments, "segment D" and the segment containing the high outliers are considered to be the highest risk users. In this embodiment, the highest overall transaction values and the highest values of a specific type of transactions (wires) are used to classify cluster 10 in segment D. In empirical studies, the users belonging to segment D are likely to have much different user features than the other segments. That is the differences between the average or median user feature values in clusters belonging to segments C and D are much greater than the differences between the average or median user feature values in clusters belonging to segments B and C or segments A and B. As discussed above, the high outlier users are those having values for one or more user features used in the clustering process. The types of monitoring actions applied to users in these segments are the highest level of monitoring and other actions taken by the system.

Figure 5:
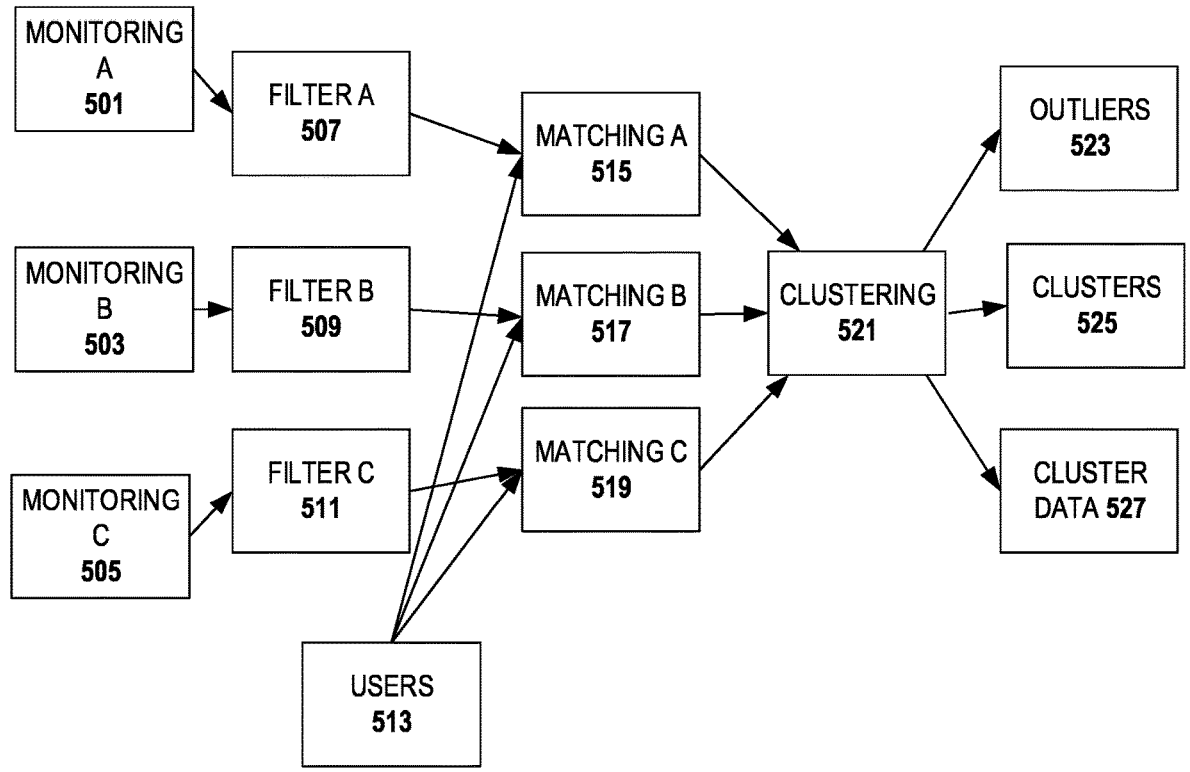
FIG. 5 is a diagram that depicts the flow of information between a set of monitoring processes and the clustering process in one embodiment of the invention.

FIG. 5 is a diagram that depicts the flow of information between a set of monitoring processes and the clustering process in one embodiment of the invention. Monitoring 501, 503 and 505 represent different processes which monitor respective user features. The monitoring processes may monitor different user accounts or services provided by the system. In embodiments of the invention, at least some of the monitoring processes will be built for other processes independent of the clustering process. For example, in embodiments where user transactions are monitored, the organization's chosen transaction monitoring platform may be used. Transaction monitoring platforms monitor user transactions to detect those that may be anomalous, and therefore, worthy of further review. In some embodiments, additional monitors are specially built for the cluster process for those user features where a monitoring process is unavailable or an existing process is undesirable.

As the monitoring processes produce information which is not needed by the clustering process since only selected user features are used, a set of filters 507, 509 and 511 respectively filter the streams of monitoring processes 501, 503 and 505 to produce the streams of the selected user features. In embodiments, one or more user features are provided by each stream.

The nomenclature to denote users may be different in each of the monitoring processes and/or different than that used the clustering process. Thus, in some embodiments a set of matching processes 515, 517 and 519 match the user features to the users through the use of a user database 513. The user database 513 may contain sets of usernames using the different nomenclatures as well as user account names from which the respective user features are monitored.

The clustering process 521 is described above. It takes the user feature and user data from the matching streams to determine the outlier users 523, assign the remainder of the users to the clusters 525 and provide cluster data 527 such as the criteria for user membership in each cluster. The user membership criteria can be used when new users are added to the system to determine to which clusters the new users should belong.

Figure 6:
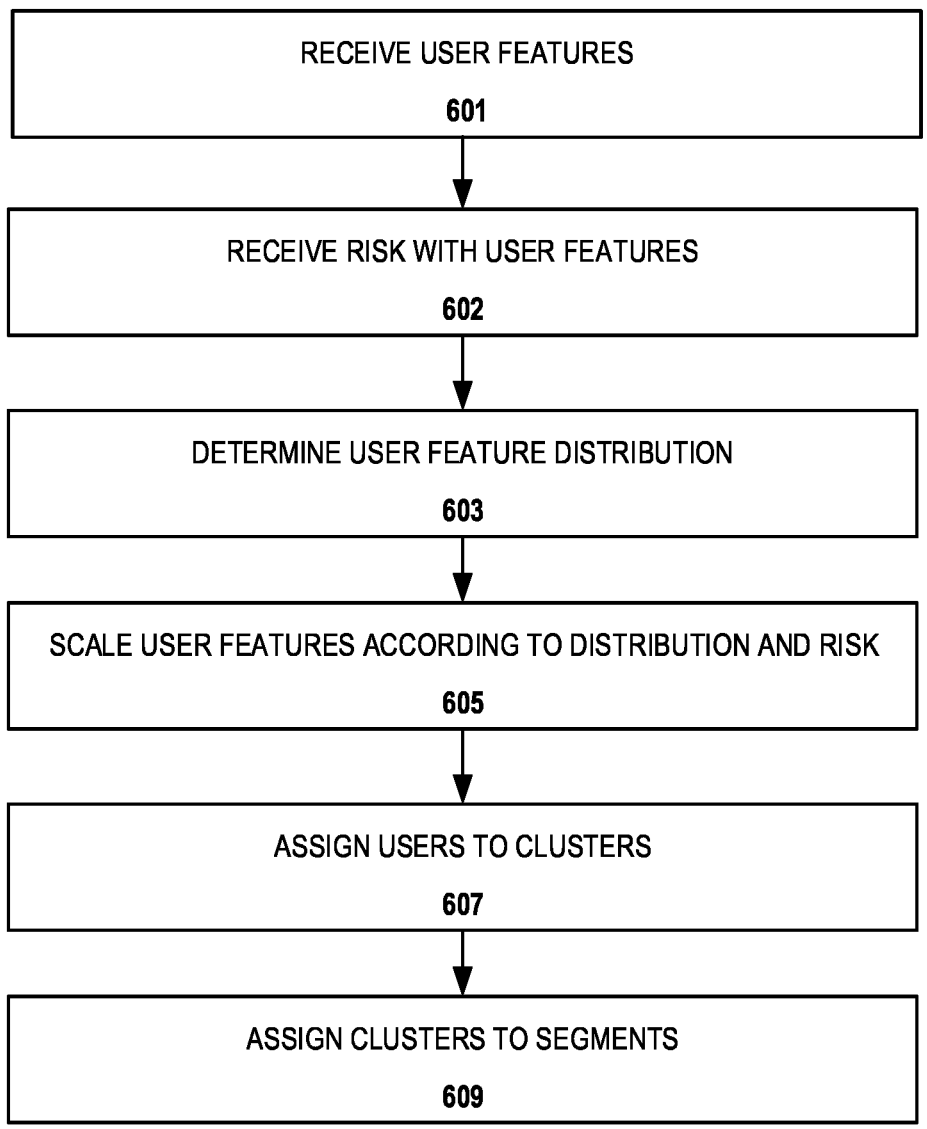
FIG. 6 is a high level flow diagram of an embodiment of the invention.

FIG. 6 is a high level flow diagram of an embodiment of the invention. In this embodiment, some of the steps described above are performed before the production environment receives inputs; then the production environment will refine the inputs for the actual user data. In step 601, the user features are received. In this embodiment of the invention, the user features to use for clustering are developed outside the production clustering process. In some embodiments, subject matter experts (SMEs) and industry experience are used to establish a set of initial user features. Certain user features, e.g., particular types of transactions, which users typically request from a system are not viewed as risky. For example, in an AML embodiment, monthly average counts and amounts of transactions in checking, money-market, and mortgage accounts can be excluded. Other user features are viewed as risky. For example, in an AML embodiment, transactions such as monthly average transaction counts and amounts of all transactions in cash, wire or offshore types are included. A smaller subset of the user features can be selected to improve the ability of the clustering algorithm to identify distinct, cohesive clusters. In embodiments, a combination of subject matter/industry expertise and the removal of correlated user features are used to select the final list of user features to use.

In step 602, the system receives the risk associated with values for the selected user features from a process outside the production clustering process. In some embodiments, subject matter expert (SME) and industry experience are used to establish expected risks associated with respective values for each final list of user features. In embodiments of the invention, machine learning is used to refine the values and thresholds received from the SME(s) based on an actual set of customers, but not necessarily the set of customers used in the production environment. That is, a machine learning model is created for a similar set of services and similar environment serviced by the production system, i.e., a target environment. The output of this model can be used to establish an initial risk-user feature relationship for the production system. Because SME input is valuable, but not infallible, the machine learning outputs and/or statistical analysis are used to determine the user feature values for respective user feature which indicate respective risk, either by itself (statistical methods or machine learning only) or in combination with the SME input.

In step 603, the system determines the user feature distribution for the user data for the production system. In embodiments, this step is based on the user features from the actual user data in the production system together with a desired cluster range. As is mentioned above, the inventors have established that 14 to 20 user clusters are optimal in many cases. In this step, within an input range, an optimal number of clusters are established based on the user data. Further, in embodiments, the thresholds for outlier users, the users which will be handled outside of the rules established for the clusters and segments, are established.

In step 605, based on the above determinations, the system scales the actual user features according to the input user feature distribution (from the model) and the input risk (also established from the model or SME inputs). The scaling compares the actual user features in the production system to the model distribution of user features a risk to obtain the desired number of clusters. Each of the initial clusters from the desired number of clusters starts with a cluster with a base user for that cluster to start the cluster assignment. Cluster assignment of other users uses the base users as a starting point. The input scaling factor is based on the distribution of the user features of the training set used in the creation of the model in some embodiments.

In embodiments of the invention, steps 603 and 605 can be combined.

In step 607, the users are assigned to specific user clusters based on the initial user feature distribution; specific users are assigned to the user clusters. In some embodiments, the user assignation is directed by a machine learning component which refines the received model according to the actual user features in the production model.

In step 609, the system assigns the user clusters to segments based on the risk associated with each cluster. In embodiments, the risk is determined by the risks attributed to respective values of the user features according to the SME input. In other embodiments, the risk is determined by the machine learning process which correlates the risk to the user features in the training or actual user feature features.

FIG. 7 shows a set of user information for an embodiment of the invention. In this embodiment, the user features and features are for an AML, embodiment. However, one skilled in the art will appreciate that the user features used for establishing the clusters and segments will differ according to the embodiment and the particular services and environment to which the principals of the invention are applied, The drawing shows a set of user information 701 which is associated with and can be used to identify the user and/or user information associated with the user. This example is for an AML, embodiment of the invention. For the user information 701, user identifying type information is included such as user ID, user account numbers and well as user classification information such as user demographic, residence, and occupation. The data structure also includes information about a set of user transactions 703 which have been associated with one or more user accounts associated with the user. Information such as the transaction amounts for the different user accounts both for the user serviced by the system as well as for users or entities that were on the receiving or sending end of a transaction with the user. In this example, additional user data 705 is included about a specific type of user transactions. In the AML example displayed, user features associated with wire transfers are included. The information is similar to that taken for the general set of transaction information above but may be augmented with information relating to specific risks (if known) relating to specific transactions. Note that if the sender or recipient of a transaction is unknown that is an indicator of potentially higher risk (than a known sender or recipient with no known risk). If a substantial portion of a user's transactions are to unknown senders or recipients, the user may be moved to a higher risk cluster or segment.

Also, in this example, additional user data 707 is included about a second type of user transactions. In the AML example displayed, user features associated with cash transfers are included. In the AML example, cash and wire transfers are regarded as high risk user activities, so the high risk user activities can have more information specific to these activities, particularly as they relate to risk for the organization. Enhanced risks can be associated with higher levels of risky user activities, as well as the geography, channels and parties engaged with a particular transaction or multiple transactions.

In embodiments of the invention, fewer user features related to less risky user activities are used in the clustering and segmenting processes as compared to the number of high risk user features. A single user feature of a set of highly correlated user features are used in embodiments of the invention.

In preferred embodiments of the invention, the different clusters are automatically assigned to a particular segment. For example, average, median or centroid values of one or more of the user features can be associated with the respective risks that the users in the cluster pose to the organization. In embodiments with automatic assignment, the clusters are assigned according to expected and/or actual user activity and the risk associated with particular user attributes. By automating the process of cluster assignment, embodiments use the measured user activity and pre-established thresholds on the different risk characteristics. In alternative embodiments, the assignment of a cluster to a segment is a manual process performed by an SME.

Further, the "inactive" user population can be identified in an automated way by identifying those users whose activity falls below a threshold. The selection of the "high outlier" population can also be automated, based on those users having high outliers" who have high user features in one or more user feature categories which exceed the thresholds established for the respective user features. That leaves the active, non-outlier users which are clustered and the clusters are aggregated into the broader segments. In embodiments of the invention, this is automated through summing the average distances for each cluster from the average for all of the active, non-outlier users for each user feature. The clusters are rank ordered from lowest distance to highest distance, such that the clusters with the highest distance from the average value would be assigned into the high risk segment. After the automatic cluster assignments to segments, the assignments are forwarded to an SME in some embodiments to assure that the clusters are correctly assigned to their respective segments.

In embodiments of the invention, a seasonal adjustment is performed for some user attributes used for clustering customers and assigning clusters to a segment. This is in recognition that users of a specific user type will exhibit a seasonal activity level. For example, an ice cream parlor near a beach may be busier in the summer than in the winter. By compensating for seasonal changes in user activity, user movement between clusters or segments can be explained to an analyst as a possible explanation for the monitored changes in user activity.

Embodiments of the invention may be used for many purposes. Although the invention is described above in terms of discovering users who are most likely to present AML risks to financial organizations, any system providing services to users may cluster and segment its users according to activity based user features to identify those users whose activities should receive enhanced monitoring and analysis.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

The present invention has many advantages over the prior art. Activity based user features provide a more reliable set of inputs than demographic or questionnaire based user features. In embodiments of the invention, user questionnaires are eliminated or greatly reduced in complexity and length, making the onboarding process for a new user less time consuming. Changes in a user's activity allow the system to quickly assign greater resources to the high risk users and remove them from the low risk users, so the monitoring resources are allocated most efficiently.

As is known, each user interacts with a system through a number of computer entities, both hardware and software which comprise parts of the system. This is described above in connection with FIGS. 1 and 2. Some of the computer entities are considered "internal" to the system, e.g., within the control of the organization, while others are considered "external" to the system, because these entities are outside the control of the system and are controlled by users or external organizations, and therefore, represent risk to the system. Given the correct conditions, the external entities are authorized to request services from the system. External computer entities under a user's control, such as a user device or software running on the user device, or external autonomous computer entities are used to make requests to the system for the system to conduct services, e.g., transactions.

Within the system, one or more bridging entities exist to allow external entities to request activities be performed in the system. User accounts are one example of a bridging entity which at least partially controlled by, represent or are otherwise associated with an external entity, i.e., the user or a user device, but also are partially controlled by the system. Because the user accounts represent an external entity, before allowing the user accounts to initiate a transaction, it is common for the user account entity to be associated with a user ID and password or other credentials so they can be authorized. The user or other external entity will log onto the system using these credentials to conduct system transactions.

While the preceding discussion of embodiments of the invention have largely discussed clustering and segmenting groups of human users, the invention can be used for monitoring the transactions of other external entities (besides human users) which pose risk to the system. When the system determines that these external entities are authorized to request system activities, e.g., transactions, the requested activities are considered activities and activity based features are derived from these entity actions so that the external entities may be clustered and segmented according to risk. The risk can be reputation based, theft of data or services, or violation of system rules resulting in unauthorized activities. In embodiments, the system rules can be based on regulations or laws promulgated by one or more jurisdictions.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for monitoring transaction activity for system requests comprising:
receiving information about a set of activity based features from a set of monitoring processes for a set of entities, the entities outside control of and authorized to request services of a system, the set of monitoring processes resident in the system;
identifying respective entities with high feature values for respective features of the set of activity based features based on a predetermined or statistically based threshold for the respective feature to produce a set of outlier entities;
filtering the set of outlier entities from the set of entities to produce a filtered set of entities; and
in response to the filtering, using a trained machine learning model to:
create a set of clusters from the filtered set of entities based at least in part on the set of activity based features,
determine values for the sets of activity based features for the respective clusters,
assign risks for the clusters based at least in part on the values of one or more of the set of activity based features,
allocate varied levels of system monitoring resources to the respective entities in the clusters based at least in part on the risks assigned to the respective clusters,
monitor the entities for: recent entity activity, and recent entity non-activity,
use the recent entity activity and the recent entity non-activity to reassign updated risks for the clusters, and
dynamically adjust the level of system monitoring resources allocated to the respective entities in the clusters based at least in part on the updated risks assigned to the respective clusters.

2. The method as recited in claim 1, wherein the trained machine learning model is further used to:
reassign entities to updated clusters based at least in part on the updated risk assigned to the respective clusters, wherein a same set of monitoring tasks are performed on entities in the same cluster.

3. The method as recited in claim 2, wherein the clusters are created based on the set of activity based features.

4. The method as recited in claim 2, further comprising:
in response to a first of the entities being reassigned from a first cluster having a higher risk to a second updated cluster having a lower risk, reducing the level of system monitoring resources allocated to the first entity, wherein entities which switch from cluster to cluster within a segment receive an unchanged amount of monitoring from the system.

5. The method as recited in claim 1, further comprising:
recreating the set of clusters on a second interval, the second interval being longer than a first interval; and
assigning the recreated clusters to respective segments based at least in part on the risk assigned to the respective cluster on the second interval.

6. The method as recited in claim 1, wherein the set of clusters are also created according to a set of non-activity based features.

7. The method as recited in claim 1, further comprising:
training a machine learning model using a set of known entities, system activities performed by the known entities, and risks encountered by the system caused by the known entities to correlate activity based features to non-activity based features;
receiving a new entity to be assigned to a cluster;
forming a set of non-activity based features for the new entity by: applying a greater weight to supplemental information associated with the new entity, and applying a lesser weight to ones of the system activities that stem from the new entity; and
assigning the new entity to a first cluster according to correlations generated by the trained machine learning model based at least in part on the non-activity based features.

8. The method as recited in claim 1, wherein the trained machine learning model is further used to:
issue a warning in response to determining that the updated risks for the clusters caused one of the entities to move from a first cluster to a second cluster, the first and second clusters having similar risks assigned thereto; and
automatically increase a level of system monitoring resources allocated to a second of the entities in response to determining that the updated risks for the clusters caused the second of the entities to move from the first cluster to a third cluster, the first and third clusters having different risks assigned thereto.

9. An apparatus comprising:
a processor;
computer memory holding computer program instructions executed by the processor for monitoring transaction activity for system requests, the computer program instructions comprising:
program code, operative to monitor transaction activity caused by service requests;
program code, operative to receive information about a set of activity based features from a set of monitoring processes for a set of entities, the entities outside control of and authorized to request services of a system;
program code, operative to identify respective entities with high feature values for respective features of the set of activity based features to produce a set of outlier entities;
program code, operative to filter the outlier entities from the set of entities based on a predetermined or statistically based threshold for the respective feature to produce a filtered set of entities; and
program code, operative in response to the filtered set of entities being produced to use a trained machine learning model to:
create a set of clusters from the filtered set of entities based at least in part on the set of activity based features,
determine values for the sets of activity based features for the respective clusters,
assign risks for the clusters based at least in part on the values of one or more of the set of activity based features,
allocate varied levels of system monitoring resources to the respective entities in the clusters based at least in part on the risks assigned to the respective clusters,
monitor the entities for: recent entity activity, and recent entity non-activity,
use the recent entity activity and the recent entity non-activity to reassign updated risks for the clusters, and dynamically adjust the level of system monitoring resources allocated to the respective entities in the clusters based at least in part on the updated risks assigned to the respective clusters.

10. The apparatus as recited in claim 9, wherein the trained machine learning model is further used to:
assign clusters to segments based at least in part on the risk assigned to the respective cluster,
wherein a same set of monitoring tasks are performed on entities in clusters assigned to a same segment.

11. The apparatus as recited in claim 9, wherein the system provides financial services for the set of entities and ones of the set of activity based features are financial transactions performed by the system for the set of entities.

12. The apparatus as recited in claim 11, wherein the risk is an anti-money laundering (AML) risk.

13. The apparatus as recited in claim 9, further comprising:
program code, operative to determine a set of low outlier entities having features values for ones of the set of activity based features below a threshold level; and
program code, operative to filter the set of low outlier entities from the set of entities to produce a second filtered set of entities.

14. The apparatus as recited in claim 9, further comprising:
program code, operative to create the set of activity based entities by compiling a set of activity based features which can be monitored by the system;
program code, operative to filter low risk features from the set of activity based features which can be monitored by the system; and
program code, operative to filter closely correlated features from the set of activity based features which can be monitored by the system.

15. A computer program product in a non-transitory computer readable medium for use in a data processing system, the computer program product holding computer program instructions executed by the data processing system for monitoring transaction activity for system requests, the computer program instructions comprising:
program code, operative to monitor transaction activity caused by service requests;
program code, operative to receive information about a set of activity based features from a set of monitoring processes for a set of entities, the entities outside control of and authorized to request services of a system;
program code, operative to identify respective entities with high feature values for respective features of the set of activity based features based on a predetermined or statistically based threshold for the respective feature to produce a set of outlier entities;
program code, operative to filter the set of outlier entities from the set of entities to produce a filtered set of entities; and
program code, operative in response to the filtering to use a trained machine learning model to:
create a set of clusters from the filtered set of entities based at least in part on the set of activity based features,
determine values for the sets of activity based features for the respective clusters,
assign risks for the clusters based at least in part on the values of one or more of the set of activity based features,
allocate varied levels of system monitoring resources to the respective entities in the clusters based at least in part on the risks assigned to the respective clusters,
monitor the entities for: recent entity activity, and recent entity non-activity,
use the recent entity activity and the recent entity non-activity to reassign updated risks for the clusters, and
dynamically adjust the level of system monitoring resources allocated to the respective entities in the clusters based at least in part on the updated risks assigned to the respective clusters.

16. The computer program product as recited in claim 15, wherein the trained machine learning model is further used to:
assign clusters to segments based at least in part on the risk assigned to the respective cluster,
wherein a same set of monitoring tasks are performed on entities in clusters assigned to a same segment.

17. The computer program product as recited in claim 16, wherein program code, operative to identify features is a machine learning process which is trained using: a set of known entities, the activities performed by entities, and the risks encountered by the system.

18. The computer program product as recited in claim 17, wherein the program code, operative to assign risks to the clusters is a machine learning process which correlates the risk to the features in a training set of existing features.

19. The computer program product as recited in claim 15, further comprising program code, operative to apply a different set of monitoring processes to entities which belong to a low risk cluster than to the entities which belong to the set of outlier entities.

20. The computer program product as recited in claim 15, wherein program code, operative to create a set of clusters by entity assignation is directed by a machine learning component which refines a received machine learning model according to the actual features of existing entities serviced by the system.

* * * * *